United States Patent
Satapathy et al.

(10) Patent No.: US 6,614,887 B1
(45) Date of Patent: Sep. 2, 2003

(54) CALLER-CONTROLLED VOICE MAIL SUB-MAILBOXES

(75) Inventors: Durga Prasad Satapathy, Olathe, KS (US); Fred S. Cook, Olathe, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 10/241,210

(22) Filed: Sep. 11, 2002

(51) Int. Cl.$^7$ ............................................. H04M 1/64
(52) U.S. Cl. ................ 379/88.22; 379/67.1; 379/70; 379/74; 379/88.04; 379/88.18; 379/88.21; 379/88.26
(58) Field of Search .................. 379/67.1, 68, 69, 379/70, 74, 88.04, 88.17, 88.18, 88.22, 88.25, 88.21, 88.26

(56) References Cited

U.S. PATENT DOCUMENTS

| | | | |
|---|---|---|---|
| 4,757,525 A | * 7/1988 | Matthews et al. | 379/88.26 |
| 5,400,393 A | 3/1995 | Knuth et al. | 379/88 |
| 5,524,140 A | * 6/1996 | Klausner et al. | 379/67 |
| 5,644,629 A | * 7/1997 | Chow | 379/142 |
| 5,748,709 A | 5/1998 | Sheerin | 379/67 |
| 5,768,349 A | * 6/1998 | Knuth et al. | 379/88 |
| 5,966,351 A | 10/1999 | Carleton et al. | 369/29 |
| 5,991,370 A | 11/1999 | Ladd | 379/88.25 |
| 6,021,181 A | * 2/2000 | Miner et al. | 379/88.23 |
| 6,097,791 A | 8/2000 | Ladd et al. | 379/88.19 |
| 6,226,359 B1 | 5/2001 | Montgomery et al. | 379/67.1 |
| 6,335,962 B1 | * 1/2002 | Ali et al. | 379/88.11 |

* cited by examiner

*Primary Examiner*—Allan Hoosain
(74) *Attorney, Agent, or Firm*—Harley R. Ball; Steven J. Funk; Kevin D. Robb

(57) ABSTRACT

A voice mail system employs caller-specific sub-mailboxes that are created within a voice mail account owner's mailbox so that a caller designates an access pincode for the sub-mailbox and then has access to the sub-mailbox for leaving messages, deleting messages, and re-ordering messages. Consequently, the voice mail systems achieve increased flexibility in accessing previous messages by one caller from multiple telephone locations, increased overall productivity of voice mail system users, the capability to allow a mailbox owner to prioritize the playing of recorded messages, and minimized connection time and battery consumption of portable, handheld devices accessing the voice mail system.

17 Claims, 3 Drawing Sheets

CALLER-CONTROLLED VOICE MAIL SUB-MAILBOXES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to telephony voice mail systems, and, more specifically, to a system for managing voice messages within a mailbox for a particular user.

Conventional voice mail systems create a mailbox for a person associated with a called telephone number (i.e., the mailbox account "owner"). When incoming calls are unanswered within a certain number of rings, they are directed to a voice mail server allowing the caller to create a recorded message to be later retrieved by the owner. The owner can typically access their mailbox either from the called telephone or remotely from other telephones in order to manage the mailbox (e.g., record a personal greeting), to review message details (e.g., day and time of message), to listen to messages, and to delete messages. The owner is required to enter a valid pincode or password in order to gain access to the mailbox.

It has been recognized that as time passes, any unretrieved messages may become superfluous or no longer accurate. When new information becomes available, the party who left a prior message may decide to make the new information available to the mailbox owner by calling and leaving an additional message. Since two messages would then be in the mailbox, and since the older, inaccurate message would typically be played back first when the owner retrieves messages, inefficiency and confusion result. U.S. Pat. No. 5,966,351, issued to Carleton et al, discloses a voice mail system wherein a sender of a message who is an authorized user of the voice mail system can access stored messages in a recipient's mailbox that were originally recorded by the sender. If so authorized, the sender is allowed to re-prioritize or delete messages in the recipient's mailbox that have not yet been retrieved. A sender's login information is compared to recorded message header information so that only messages left from the sender's own telephone extension can be accessed.

As caller mobility increases, a caller does not necessarily make every call attempt to the mailbox owner from the same telephone number. Therefore, it may be desirable to access and re-prioritize messages with different message header information, which is not possible in the system shown in Carleton et al.

This increased caller mobility results, in part, from the increased use of mobile wireless devices such as cellular telephones, PDA's, and other handheld devices. When the account owner uses a cellular telephone to retrieve messages, for example, costs may be incurred for each minute of connection time and the charge held in the portable battery of the phone is depleted to some extent. Connection minutes and battery charge are unnecessarily consumed whenever obsolete messages are retrieved.

When retrieving messages from an electronic mailbox, the messages are typically presented in chronological order. In Carleton et al, the message sender has the ability to re-order or re-prioritize the messages they have sent. Such re-prioritization does not involve messages of other senders. Thus, during retrieval of messages as known in the prior art, messages are played in an order assumes the mailbox owner's priority to be to listen to the oldest messages first. However, it is possible or even likely that more important messages will not be accessed until lesser important messages have been reviewed, thereby requiring a cellular phone user to expend connect time and battery charge in a potentially wasteful manner.

SUMMARY OF THE INVENTION

The present invention has the advantages of increasing voice mail system flexibility in accessing previous messages by one caller from multiple telephone locations, increasing overall productivity of voice mail system users, allowing a mailbox owner to prioritize the playing of recorded messages, and minimizing connection time and battery consumption of portable, handheld devices. These advantages are achieved by a mailbox system wherein sub-mailboxes are created within the account owner's mailbox such that a caller designates an access pincode for the sub-mailbox and then has access to the sub-mailbox for leaving messages, deleting messages, and re-ordering messages.

In one aspect of the invention, a method is provided for processing an incoming telephone call to a called telephone number from a caller at a calling telephone number wherein the incoming telephone call is directed to a target mailbox in a voice mail system and the target mailbox includes sub-mailboxes for containing recorded messages. A sub-mailbox is selected for access by the caller during the incoming telephone call. Access by the caller to the selected sub-mailbox is authorized in response to the caller inputting a valid sub-mailbox pincode corresponding to the selected sub-mailbox. An action from a group of actions is selected including a new message action for leaving a new recorded message in the selected sub-mailbox and a message delete action for deleting an existing message stored in the selected sub-mailbox. Then the selected action is executed.

DETAILED DESCRIPTION OF PREFERRED EMBODIMENTS

Figure 1:
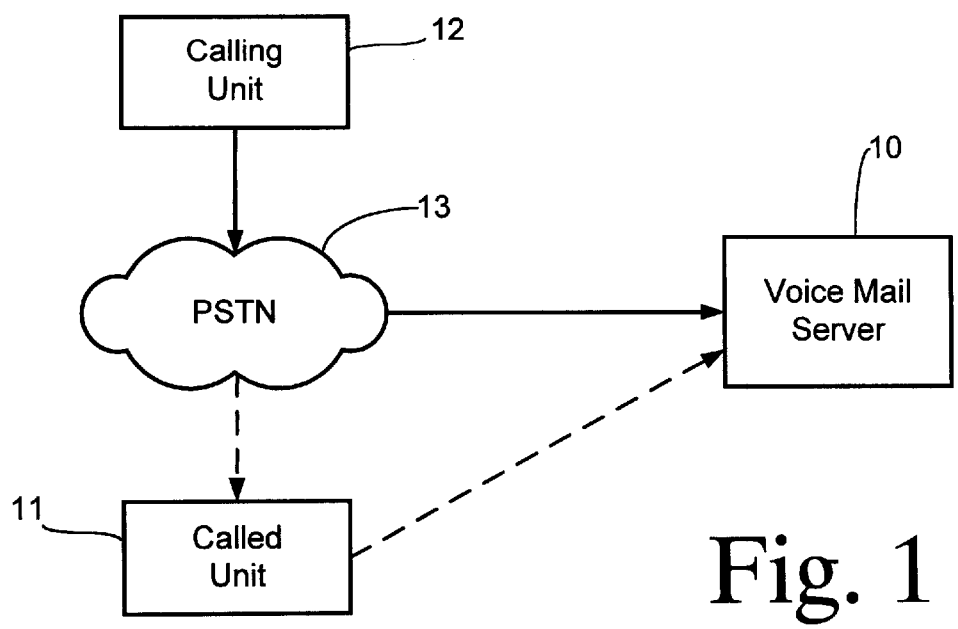
FIG. 1 is a block diagram showing a voice mail system.

Referring to FIG. 1, a voice mail server 10 may comprise a conventional hardware device with novel programming according to the present invention. A mailbox account is associated with the telephone number of a called telephone unit 11 belonging to the mailbox owner. The mailbox may be accessed by either a message sender or the mailbox owner from a remote telephone unit or calling unit 12 via a public switched telephone network (PSTN) 13, for example. Voice mail server 10 can, for instance, reside within a main telephone system such as a PBX of a large enterprise so that server 10 is available via a dedicated telephone number or line (i.e., when a telephone call to called unit 11 is unanswered, the call is automatically transferred to the dedicated line of server 10). Alternatively, server 10 may be directly connected with the telephone line serving called unit 11.

Figure 2:
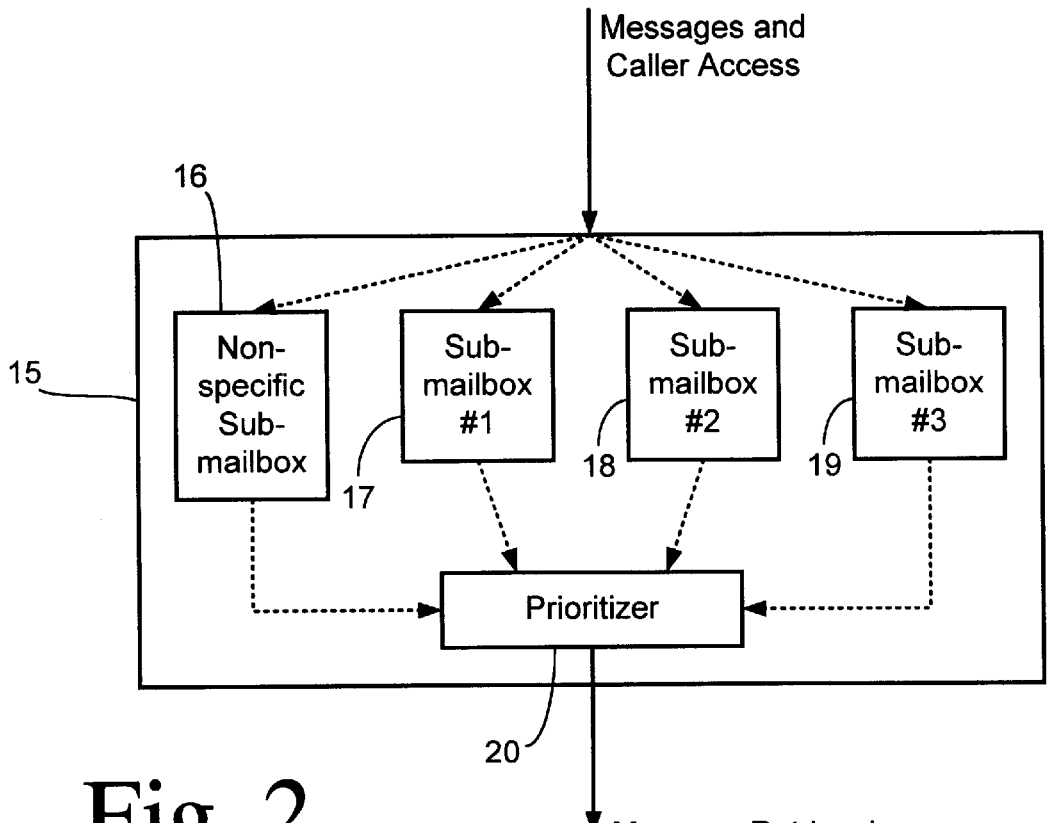
FIG. 2 is a block diagram showing a mailbox divided into a plurality of sub-mailboxes.

As shown in FIG. 2, a mailbox 15 includes a non-caller-specific sub-mailbox 16 (for any callers that do not wish to avail themselves of the added sub-mailbox access features), and caller specific sub-mailboxes 17–19 (e.g., for callers #1, #2, and #3). Incoming messages and caller management access are directed to these sub-mailboxes as shown. During message retrieval by the mailbox owner, a prioritizer 20, which is configured by the owner, selects messages from all the sub-mailboxes to replay in an order determined by the configuration.

Figure 3:
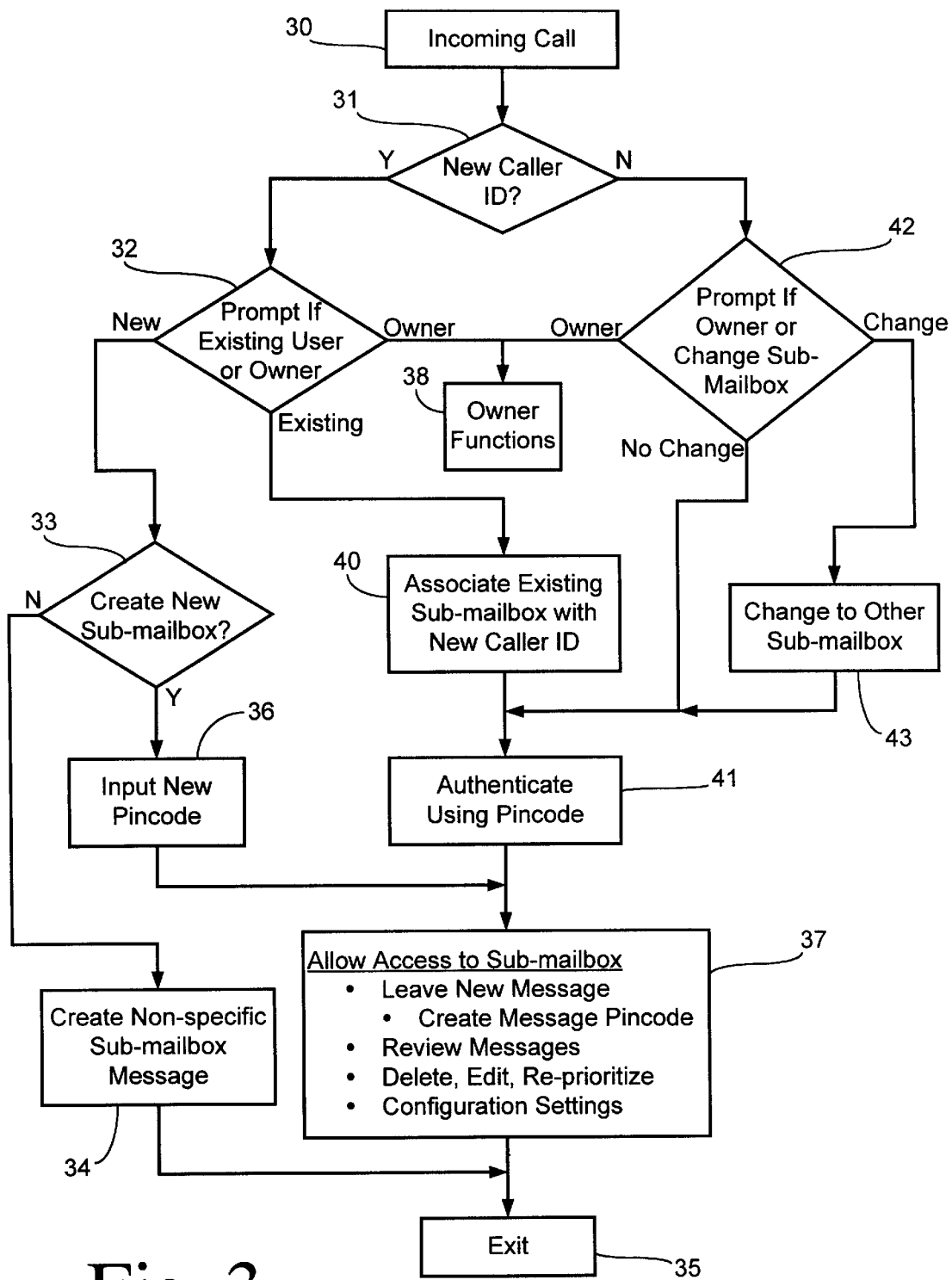
FIG. 3 is a flowchart of a preferred embodiment for handling an incoming call for accessing a sub-mailbox.

A preferred method of the invention shown in FIG. 3 begins when an incoming call is received by the voice mail system in step 30. In one preferred embodiment, the incoming or calling telephone number is determined by the voice mail system using automatic number identification (ANI), also known as caller ID (CID). Since most callers would initiate most of their calls to the owner's voice mailbox from the same telephone number, the calling number is used to provide an initial prediction of the sub-mailbox that a caller may desire to access (although the caller can subsequently identify a different sub-mailbox).

In step 31, the incoming telephone number is checked against the telephone numbers associated with all existing sub-mailboxes. If it is a new telephone number (i.e., there are no matches), then a voice prompt is played in step 32 asking the caller whether they are an existing user (i.e., they want access to an existing sub-mailbox), the owner of the mailbox, or a new user. If the caller responds that they are a new user (e.g., by pressing a touch-tone push button identified by the voice prompt), then they are prompted in step 33 for an indication of whether the caller wants to create a new sub-mailbox or whether the sub-mailbox features are to be skipped. If a new sub-mailbox is not desired, then the caller is allowed to record a message in step 34 and the recorded message is stored in the non-specific sub-mailbox and the system exits in step 35. Consequently, the caller cannot later access the recorded message for deletion or re-prioritization.

If the new user indicates in step 33 that a new sub-mailbox is to be created, then they are prompted to input a new pincode to be used to control access to the new sub-mailbox. After inputting the new pincode in step 36, the caller gains access to a menu of sub-mailbox functions in step 37.

If the caller indicates in step 32 that they are the mailbox owner, then owner functions are accessed at step 38 (shown in greater detail in FIG. 4, discussed below). If, on the other hand, the caller indicates that they wish to access an existing sub-mailbox, then the sub-mailbox is identified in step 40 and the new caller telephone number ID is added to a list associated with the existing sub-mailbox. The caller may, for example, identify an existing sub-mailbox by inputting (via the touch tone keypad of their telephone) a telephone number already associated with the existing sub-mailbox (or, alternatively, a separate identifier such as a one or two digit sub-mailbox code assigned by the voice mail system at the time of sub-mailbox creation). Once the desired sub-mailbox is identified, the caller is prompted to enter the pincode for gaining access to that sub-mailbox (e.g., previously specified in step 36 when the sub-mailbox was first created). If the caller is properly authenticated by entering the valid pincode in step 41, then the caller gains access to the menu of sub-mailbox functions in step 37.

If the checking of the incoming caller ID in step 31 determines that the calling telephone number is not new (i.e., there is a matching telephone number associated with an existing sub-mailbox), the voice mail system creates a voice prompt informing the caller of the identity of the default sub-mailbox and then a prompt in step 42 to ask the caller to indicate whether they want to change to a different sub-mailbox or if they are the mailbox owner. If the caller is the owner, then owner functions are initiated in step 38. If not the owner and no change is indicated, then the caller authenticates to the default sub-mailbox using the valid pincode in step 41. If the caller wishes to change to a different sub-mailbox, then the other sub-mailbox is identified in step 43 and the caller is prompted to authenticate to the other sub-mailbox in step 41.

Once a caller gains access to the sub-mailbox action menu in step 37, various choices are made available including 1) a new message action for leaving a new recorded message in the selected sub-mailbox, 2) a review messages action for listening to individual messages already waiting in the selected sub-mailbox, and 3) a message delete action for deleting an existing message stored in the selected sub-mailbox. Other actions include an edit message action wherein the caller can modify (e.g., re-record or delete portions of) existing messages and a prioritization message action wherein the caller can re-prioritize the messages waiting in the selected sub-mailbox.

The new message action may preferably include an option to create a unique, message-specific pincode that would be required in order to retrieve the message from the sub-mailbox. The message-specific pincode would be agreed upon by the caller and the mailbox owner to provide additional security against the possibility of a message being accessed by an unintended party.

Another sub-mailbox action is comprised of an auto-delete action wherein selected messages or groups of messages (e.g., the entire sub-mailbox) may be flagged for automatic deletion at a specific future time without further action by the caller. The future time may be specified in terms of the passing of a specified time interval (e.g., 5 hours after the message was left), a particular date and time-of-day, or the next occurrence of a specified recurring event (e.g., the close of business on Friday). Thus, if an unretrieved message still resides in the owner's mailbox at the specified future time, then it is deleted from the mailbox and the owner will not have to handle an obsolete message. Messages for which auto-deletion is useful include messages giving stock price updates or weather updates, for example.

Figure 4:
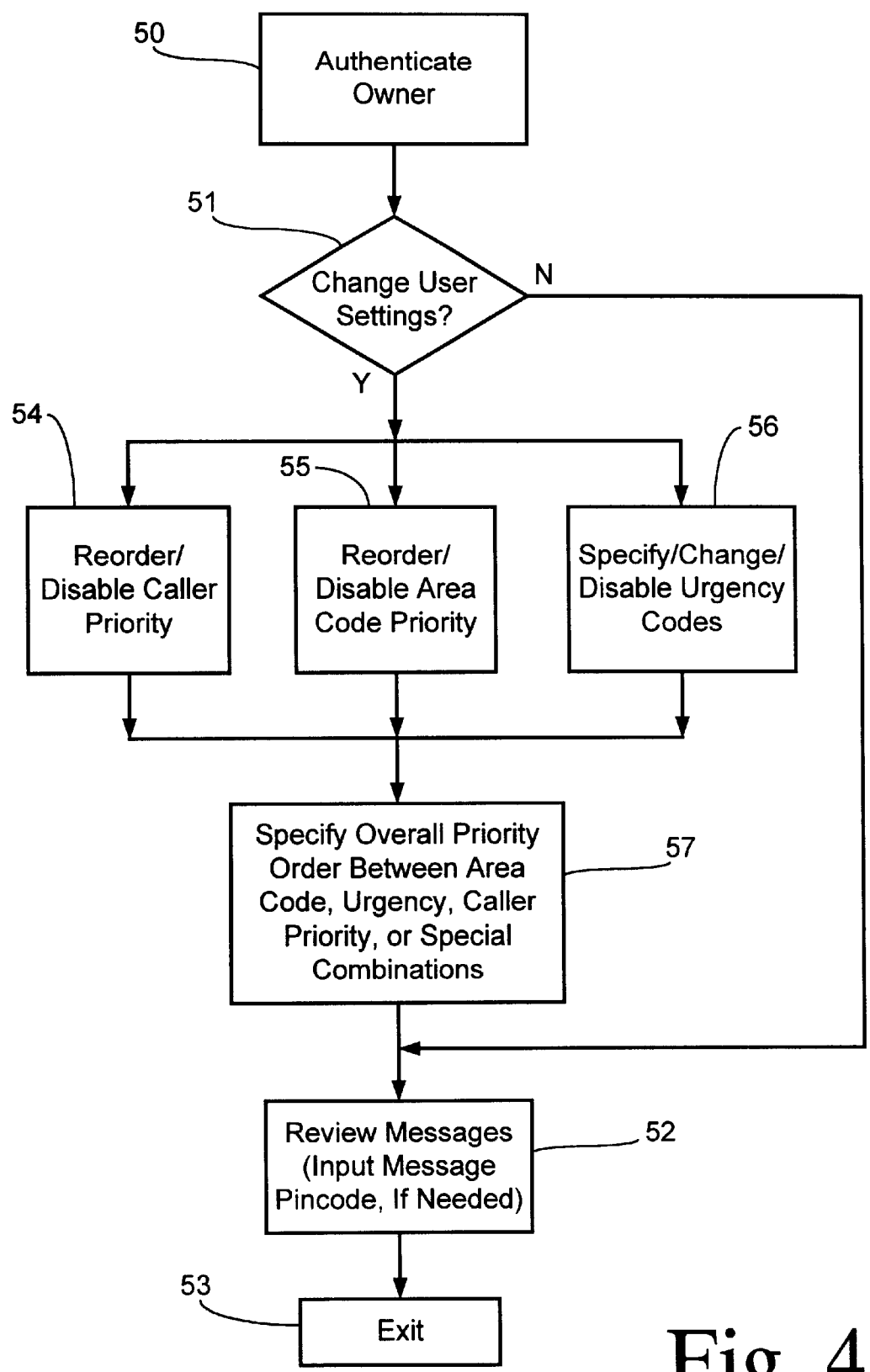
FIG. 4 is a flowchart of a preferred embodiment for owner access to the mailbox.

Referring to FIG. 4, when a caller is identified as the mailbox owner, authentication in response to an owner pincode is performed in step 50. After validation, the owner is offered an option in step 51 to change various user settings which configure the priority of message playback when the mailbox is accessed. If no configuration changes are desired, then messages are reviewed (e.g., played back and/or deleted) in step 52. Retrieving messages having a message-specific pincode will first require the owner to input the message-specific pincode as separately communicated between the owner and the caller. When finished reviewing messages and performing other functions (e.g., administering greetings), the voice mail system is exited at step 53.

If the owner chooses to change user settings in step 51, then several different optional settings are presented including settings to re-order or disable a caller priority in step 54. Callers for this priority may be identified by the corresponding sub-mailboxes or by the calling telephone number associated with a message, for example. When a higher caller priority is indicated by the owner for a particular caller, then messages from that particular caller will be replayed before those of other callers (unless affected by a high level priority setting as described below).

In step 55, the owner may re-order or disable a telephone number area code priority wherein particular area codes can be designated as having a higher or lower priority than other (specified or unspecified) area codes. For example, this user setting can be used to ensure that local calls (i.e., the same area code as the owner's telephone number) are reviewed first, or alternatively, that long distance calls are reviewed first.

In step 56, the owner may re-order or disable an urgency code priority wherein particular urgency codes can be designated as having a higher or lower priority than other such codes or messages lacking an urgency code. For example, predetermined codes can be defined for family emergencies, urgent business dealings, medium importance messages, and others. These predetermined urgency codes may be provided within the overall design of the voice mail system or may be specified by the mailbox owner in step 56 to be used only for the respective mailbox. The caller would be prompted to enter an urgency code when leaving a corresponding message.

Based on any priority settings from steps 54–56, an overall priority or hierarchy between the caller priority, area code priority, and urgency code priority can be configured in step 57. For example, caller priority may be set at a higher overall priority than the area code priority so that although local telephone calls would tend to be played ahead of long distance calls, a message left by a visiting out-of-town business colleague made from their cellular phone with a low priority area code would be retrieved prior to messages left using local calls. Other special combinations of priority factors can also be specified, such as combinations of one particular urgency code and a particular area code getting the highest overall priority, for example.

What is claimed is:

1. A method of processing an incoming telephone call to a called telephone number from a caller at a calling telephone number wherein said incoming telephone call is directed to a target mailbox corresponding to an owner in a voice mail system, wherein said target mailbox includes sub-mailboxes for containing recorded messages, said method comprising the steps of:

selecting a sub-mailbox for access by said caller during said incoming telephone call;

authorizing access by said caller to said selected sub-mailbox of said target mailbox corresponding to said owner in response to said caller inputting a valid sub-mailbox pincode corresponding to said selected sub-mailbox;

selecting an action from a group of actions including a new message action for leaving a new recorded message in said selected sub-mailbox and a message delete action for deleting an existing message stored in said selected sub-mailbox; and executing said selected action.

2. The method of claim 1 wherein a plurality of said sub-mailboxes each has at least one telephone number associated with it, and wherein said step of selecting a sub-mailbox comprises the steps of:

detecting said calling telephone number;

comparing said calling telephone number with said telephone numbers associated with said sub-mailboxes to find a match;

if a match is found, then prompting said caller to input said valid sub-mailbox pincode corresponding to said matching sub-mailbox;

if no match is found, then prompting said caller to choose to access an existing sub-mailbox or to create a new sub-mailbox.

3. The method of claim 2 wherein if said caller chooses to create a new sub-mailbox then said caller inputs a new sub-mailbox pincode and wherein said detected incoming telephone number is associated with said new sub-mailbox.

4. The method of claim 2 wherein if said caller chooses to access an existing sub-mailbox then said caller inputs information to specify said existing sub-mailbox and its associated sub-mailbox pincode and wherein said detected incoming telephone number is associated with said existing sub-mailbox.

5. The method of claim 2 wherein if said matching sub-mailbox is found then identifying said matching sub-mailbox to said caller and prompting said caller to chose to select said matching sub-mailbox or to select a different sub-mailbox.

6. The method of claim 1 wherein said new message action is comprised of leaving a recorded voice message and creating a new message pincode to be required for retrieving said recorded voice message.

7. The method of claim 1 wherein said group of actions further includes a prioritization action for arranging a priority for replaying existing messages stored in said selected sub-mailbox.

8. The method of claim 1 wherein said message delete action is comprised of immediately deleting an existing message.

9. The method of claim 1 wherein said message delete action is comprised of identifying a future time when an existing message will be deleted.

10. The method of claim 9 wherein said future time occurs after the passing of a specified time interval.

11. The method of claim 9 wherein said future time occurs at a specified date and time-of-day.

12. The method of claim 9 wherein said future time occurs at the next occurrence of a specified recurring event.

13. A method for accessing a voice mailbox in a voice mail system by an owner of said voice mailbox, wherein said voice mailbox includes a plurality of sub-mailboxes for storing messages left by respective callers, said method comprising the steps of:

said owner connecting with said voice mail system via a telephone call connection;

said owner inputting a valid pincode for accessing said voice mailbox;

said owner optionally listening to recorded messages stored in said voice mailbox from each of said sub-mailboxes, said recorded messages being presented according to a predetermined priority; and said owner optionally configuring user settings for said voice mailbox in order to specify said predetermined priority;

wherein said step of listening to recorded messages includes inputting a valid message pincode created by a caller that recorded a corresponding message.

14. The method of claim 13 wherein said step of configuring user settings comprised of establishing a priority between sub-mailboxes.

15. The method of claim 13 wherein said step of configuring user settings is comprised of establishing a priority between telephone area codes associated with each recorded message.

16. The method of claim 13 wherein said step of configuring user settings is comprised of establishing a priority between urgency codes associated with each recorded message.

17. The method of claim 13 wherein said step of configuring user settings is comprised of establishing a priority between sub-mailboxes, establishing a priority between telephone area codes associated with each recorded message, establishing a priority between urgency codes associated with each recorded message, and establishing a priority between said sub-mailbox priority, said area code priority, and said urgency code priority.

* * * * *